US011060504B1

(12) United States Patent
Virani et al.

(10) Patent No.: US 11,060,504 B1
(45) Date of Patent: Jul. 13, 2021

(54) SYSTEMS AND METHODS FOR CONTINUOUS MACHINE LEARNING BASED CONTROL OF WIND TURBINES

(71) Applicant: General Electric Company, Schenectady, NY (US)

(72) Inventors: Nurali Virani, Niskayuna, NY (US); Scott Charles Evans, Burnt Hills, NY (US); Samuel Davoust, Bavaria (DE); Samuel Bryan Shartzer, Greenville, SC (US); Dhiraj Arora, Rexford, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/784,798

(22) Filed: Feb. 7, 2020

(51) Int. Cl.
*F03D 7/04* (2006.01)
*F03D 7/02* (2006.01)
(Continued)

(52) U.S. Cl.
CPC ........... *F03D 7/045* (2013.01); *F03D 7/0224* (2013.01); *F03D 7/0292* (2013.01); *F03D 7/046* (2013.01);
(Continued)

(58) Field of Classification Search
CPC .......... F03D 7/045; F03D 7/046; F03D 7/047; F03D 7/0224; F03D 7/0292; F03D 17/00;
(Continued)

(56) References Cited

U.S. PATENT DOCUMENTS

| 7,004,724 B2 | 2/2006 | Pierce et al. |
| 7,118,339 B2 | 10/2006 | Moroz et al. |

(Continued)

FOREIGN PATENT DOCUMENTS

| EP | 2048562 B1 | 8/2009 |
| EP | 2213873 A1 | 8/2010 |

(Continued)

OTHER PUBLICATIONS

Evans et al., "Wind farm performance validation through machine learning: Sector-wise Honest Brokers", 2015 IEEE Aerospace Conference, Issue: Mar. 7, 2015-Mar. 14, 2015, pp. 1-8, Conference location: Big Sky, MT, USA.

(Continued)

*Primary Examiner* — Pedro J Cuevas
(74) *Attorney, Agent, or Firm* — Dority & Manning, P.A.

(57) ABSTRACT

A control system is disclosed. The control system includes a wind turbine, at least one sensor configured to detect at least one property of the wind turbine to generate measurement data, and a controller communicatively coupled to the wind turbine and the at least one sensor. The controller includes at least one processor in communication with at least one memory device. The at least one processor is configured to control, during a training phase, the wind turbine according to at least one test parameter, receive, from the at least one sensor, during the training phase, first measurement data, generate, based on the at least one test parameter and the received first measurement data, a control model, receive, during an operating phase, second measurement data from the at least one sensor, and update the control model continuously based on the second measurement data.

20 Claims, 3 Drawing Sheets

(51) Int. Cl.
*F03D 17/00* (2016.01)
*G06N 3/08* (2006.01)
*G06N 20/00* (2019.01)

(52) U.S. Cl.
CPC ............. *F03D 7/047* (2013.01); *F03D 17/00* (2016.05); *G06N 3/08* (2013.01); *G06N 20/00* (2019.01); *F05B 2270/1095* (2013.01); *F05B 2270/332* (2013.01)

(58) Field of Classification Search
CPC .......... G06N 3/08; G06N 3/088; G06N 20/00; F05B 2270/1095; F05B 2270/332
USPC ...................................... 290/44, 55; 700/289
See application file for complete search history.

(56) References Cited

U.S. PATENT DOCUMENTS

| | | | |
|---|---|---|---|
| 7,883,317 B2 | 2/2011 | Ormel et al. | |
| 7,987,067 B2 | 7/2011 | Harrison et al. | |
| 8,025,476 B2 * | 9/2011 | Zheng | F03D 7/046 415/1 |
| 8,057,174 B2 | 11/2011 | Scholte-Wassink | |
| 8,239,071 B2 | 8/2012 | Lausen | |
| 8,269,361 B2 | 9/2012 | Egedal | |
| 8,398,369 B2 | 3/2013 | Rebsdorf et al. | |
| 8,712,593 B2 | 4/2014 | Bjertrup et al. | |
| 9,217,416 B2 * | 12/2015 | Spruce | F03D 7/0272 |
| 9,261,076 B2 | 2/2016 | Abdallah et al. | |
| 9,466,032 B2 * | 10/2016 | Dull | G06N 3/0481 |
| 9,551,322 B2 * | 1/2017 | Ambekar | F03D 7/045 |
| 9,605,558 B2 | 3/2017 | Perley et al. | |
| 9,606,518 B2 | 3/2017 | Evans et al. | |
| 9,644,612 B2 | 5/2017 | Evans et al. | |
| 9,683,552 B2 | 6/2017 | Tiwari et al. | |
| 9,739,262 B2 * | 8/2017 | Wang | F03D 17/00 |
| 9,777,706 B2 | 10/2017 | Couchman et al. | |
| 9,790,921 B2 | 10/2017 | Egedal et al. | |
| 9,822,764 B2 | 11/2017 | Esbensen et al. | |
| 9,991,771 B2 * | 6/2018 | Zhu | B60L 15/2009 |
| 10,247,170 B2 | 4/2019 | Evans et al. | |
| 10,288,037 B2 * | 5/2019 | Cosack | F03D 9/255 |
| 10,360,500 B2 * | 7/2019 | Kabul | G06N 3/0454 |
| 10,666,076 B1 * | 5/2020 | Kohn | G01R 31/367 |
| 10,731,630 B2 * | 8/2020 | Tiwari | F03D 7/0272 |
| 10,832,087 B1 * | 11/2020 | Wang | H04B 17/3913 |
| 2010/0014969 A1 | 1/2010 | Wilson et al. | |
| 2010/0092292 A1 | 4/2010 | Nies et al. | |
| 2010/0135789 A1 * | 6/2010 | Zheng | F03D 7/046 416/1 |
| 2013/0106107 A1 * | 5/2013 | Spruce | F03D 7/0224 290/44 |
| 2013/0184838 A1 | 7/2013 | Tchoryk et al. | |
| 2014/0100703 A1 * | 4/2014 | Dull | G05B 13/04 700/289 |
| 2015/0050145 A1 * | 2/2015 | Cosack | F03D 7/04 416/1 |
| 2015/0152847 A1 | 6/2015 | Guadayol Roig | |
| 2015/0214821 A1 * | 7/2015 | Zhu | B60L 15/2009 290/44 |
| 2015/0233348 A1 | 8/2015 | Hiremath et al. | |
| 2015/0308416 A1 * | 10/2015 | Ambekar | F03D 17/00 700/287 |
| 2016/0032893 A1 * | 2/2016 | Herrig | F03D 7/048 290/44 |
| 2016/0169204 A1 * | 6/2016 | Wang | F03D 7/00 290/44 |
| 2017/0122289 A1 | 5/2017 | Kristoffersen et al. | |
| 2017/0328346 A1 | 11/2017 | Hales et al. | |
| 2017/0350369 A1 | 12/2017 | Evans et al. | |
| 2018/0030955 A1 | 2/2018 | Vaddi et al. | |
| 2018/0307986 A1 * | 10/2018 | Kabul | G06N 3/0454 |
| 2018/0364694 A1 * | 12/2018 | Watanabe | G06F 30/20 |
| 2019/0170119 A1 | 6/2019 | Nielsen | |
| 2019/0203693 A1 * | 7/2019 | Tiwari | H02J 3/38 |
| 2019/0278242 A1 * | 9/2019 | Gervais | G06N 3/08 |
| 2019/0317741 A1 * | 10/2019 | Herr | G06F 9/5044 |
| 2019/0317880 A1 * | 10/2019 | Herr | G06F 11/3409 |
| 2020/0064788 A1 * | 2/2020 | Hentschel | G05B 13/048 |
| 2020/0082043 A1 * | 3/2020 | Chu | G06F 30/20 |
| 2020/0192306 A1 * | 6/2020 | Virani | G05B 13/0275 |
| 2020/0271093 A1 * | 8/2020 | Grunnet | F03D 7/0224 |
| 2020/0285738 A1 * | 9/2020 | Tippenhauer | G06F 21/554 |
| 2020/0291921 A1 * | 9/2020 | Ou | F03D 7/045 |
| 2020/0291922 A1 * | 9/2020 | Hovgaard | F03D 7/045 |
| 2020/0300227 A1 * | 9/2020 | Evans | F03D 17/00 |
| 2020/0340450 A1 * | 10/2020 | Grunnet | F03D 7/0276 |
| 2020/0401891 A1 * | 12/2020 | Xu | G06F 1/10 |
| 2021/0049460 A1 * | 2/2021 | Ahn | G06N 3/08 |

FOREIGN PATENT DOCUMENTS

| | | |
|---|---|---|
| EP | 2518308 A1 | 10/2012 |
| WO | 2017211367 A1 | 12/2017 |
| WO | 2017211368 A1 | 12/2017 |
| WO | 2018121668 A1 | 7/2018 |

OTHER PUBLICATIONS

Leahy et al., "Diagnosing wind turbine faults using machine learning techniques applied to operational data", 2016 IEEE International Conference on Prognostics and Health Management (ICPHM), Jun. 20, 2016-Jun. 22, 2016, pp. 1-8 Conference location: ON, Canada.

Marvuglia et al., "Monitoring of wind farms' power curves using machine learning techniques", Applied Energy, Oct. 2012, vol. 98, pp. 574-583.

* cited by examiner

SYSTEMS AND METHODS FOR CONTINUOUS MACHINE LEARNING BASED CONTROL OF WIND TURBINES

BACKGROUND

The field of the invention relates generally to wind turbine control systems, and more particularly, to a system and method for continuous machine learning based control of wind turbines.

Most known wind turbines include a rotor having multiple blades. The rotor is sometimes coupled to a housing, or nacelle, that is positioned on top of a base, for example, a tubular tower. At least some known utility grade wind turbines, i.e., wind turbines designed to provide electrical power to a utility grid, have rotor blades having predetermined shapes and dimensions. The rotor blades transform kinetic wind energy into blade aerodynamic forces that induce a mechanical rotational torque to drive one or more generators, subsequently generating electric power.

Wind turbines are exposed to large variations in wind inflow, which exert varying loads to the wind turbine structure, particularly the wind turbine rotor and shaft. Some known wind turbines include sensor assemblies to detect characteristics of the wind such as direction and speed remotely. The detected wind characteristics may be used to control mechanical loads of the wind turbine. For example, based on a detected wind speed, the wind turbine may be controlled to operate at a particular output power. The output power is generally selected using a wind speed power curve. Such curves generally account for one input variable (e.g., wind speed), and generally are not optimized for a variety of different factors under all operating conditions. An improved control system for wind turbines is therefore desirable.

BRIEF DESCRIPTION

In one aspect, a control system is disclosed. The control system includes a wind turbine, at least one sensor configured to detect at least one property of the wind turbine to generate measurement data, and a controller communicatively coupled to the wind turbine and the at least one sensor. The controller includes at least one processor in communication with at least one memory device. The at least one processor is configured to control, during a training phase, the wind turbine according to at least one test parameter, receive, from the at least one sensor, during the training phase, first measurement data, generate, based on the at least one test parameter and the received first measurement data, a control model, receive, during an operating phase, second measurement data from the at least one sensor, update the control model continuously based on the second measurement data, and control operation of the wind turbine, using the generated control model, based on the received second measurement data.

In another aspect, a controller is disclosed. The controller is communicatively coupled to a wind turbine and at least one sensor. The controller includes at least one processor in communication with at least one memory device. The at least one processor is configured to control, during a training phase, the wind turbine according to at least one test parameter, receive, from the at least one sensor, during the training phase, first measurement data, generate, based on the at least one test parameter and the received first measurement data, a control model, receive, during an operating phase, second measurement data from the at least one sensor, update the control model continuously based on the second measurement data, and control operation of the wind turbine, using the generated control model, based on the received second measurement data.

In another aspect, a method for controlling a wind turbine using a controller is disclosed. The controller is communicatively coupled to the wind turbine and at least one sensor. The controller includes at least one processor in communication with at least one memory device. The method includes controlling, by the controller, during a training phase, the wind turbine according to at least one test parameter, receiving, by the controller, from the at least one sensor, during the training phase, first measurement data, generating, by the controller, based on the at least one test parameter and the received first measurement data, a control model, receiving, by the controller, during an operating phase, second measurement data from the at least one sensor, updating, by the controller, the control model continuously based on the second measurement data, and controlling, by the controller, operation of the wind turbine, using the generated control model, based on the received second measurement data.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The embodiments described herein include a control system including a wind turbine, at least one sensor configured to detect at least one property of the wind turbine to generate measurement data, and a controller communicatively coupled to the wind turbine and the at least one sensor. The controller includes at least one processor in communication with at least one memory device. The at least one processor is configured to control, during a training phase, the wind turbine according to at least one test parameter, receive, from the at least one sensor, during the training phase, first measurement data, generate, based on the at least one test parameter and the received first measurement data, a control model, receive, during an operating phase, second measurement data from the at least one sensor, update the control model continuously based on the second measurement data, and control operation of the wind turbine, using the generated control model, based on the received second measurement data.

Figure 1:
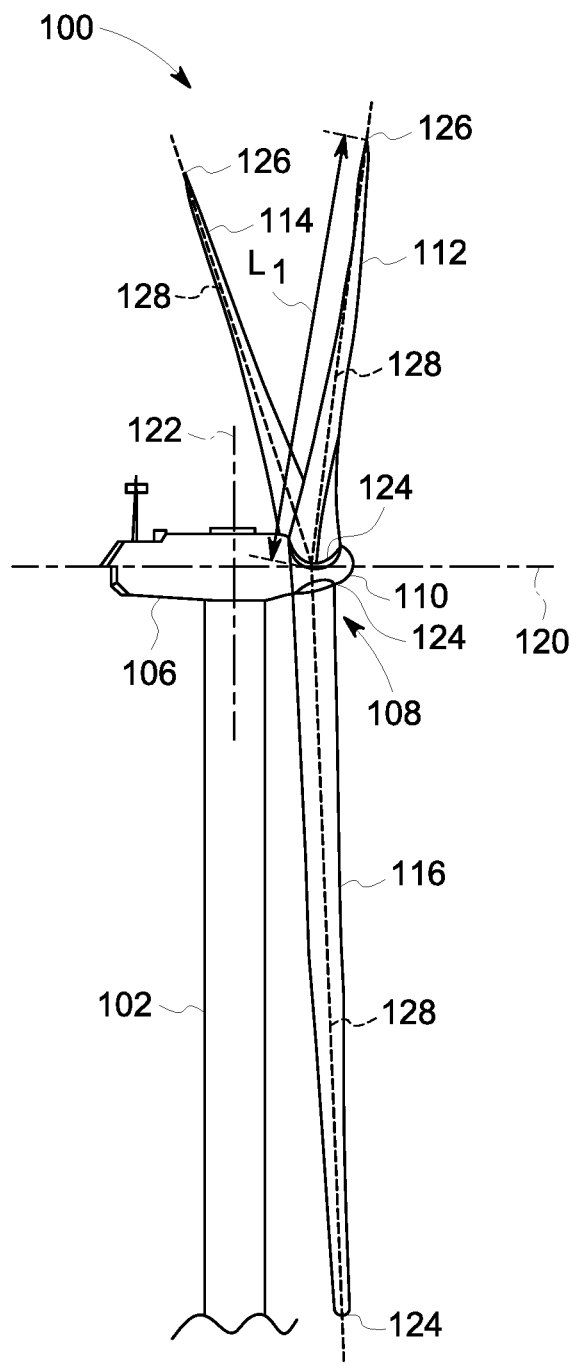
FIG. 1 is a perspective view of an exemplary wind turbine.

FIG. 1 is a schematic perspective view of an exemplary wind turbine 100. In the exemplary embodiment, wind turbine 100 is a horizontal axis wind turbine. Wind turbine 100 includes a tower 102 extending from a supporting surface (not shown), a nacelle 106 coupled to tower 102, and a rotor 108 coupled to nacelle 106. Rotor 108 has a rotatable hub 110 and a plurality of blades 112, 114, 116 coupled to rotatable hub 110. In the exemplary embodiment, rotor 108 has a first blade 112, a second blade 114, and a third blade 116. In alternative embodiments, rotor 108 has any number of blades 112, 114, 116 that enables wind turbine 100 to function as described herein. In the exemplary embodiment, tower 102 is fabricated from tubular steel and has a cavity (not shown in FIG. 1) extending between the supporting surface and nacelle 106. In alternative embodiments, wind turbine 100 includes any tower 102 that enables wind turbine 100 to operate as described herein. For example, in some embodiments, tower 102 is any one of a lattice steel tower, guyed tower, concrete tower and hybrid tower.

In the exemplary embodiment, blades 112, 114, 116 are positioned about rotatable hub 110 to facilitate rotating rotor 108 when wind flows through wind turbine 100. When rotor 108 rotates, kinetic energy from the wind is transferred into usable mechanical energy, and subsequently, electrical energy. During operation, rotor 108 rotates about a rotation axis 120 that is substantially parallel to the supporting surface. In addition, in some embodiments, rotor 108 and nacelle 106 are rotated about tower 102 on a yaw axis 122 to control the orientation of blades 112, 114, 116 with respect to the direction of wind. In alternative embodiments, wind turbine 100 includes any rotor 108 that enables wind turbine 100 to operate as described herein.

In the exemplary embodiment, each blade 112, 114, 116 is coupled to rotatable hub 110 at a hub end 124 and extends radially outward from rotatable hub 110 to a distal end 126. Each blade 112, 114, 116 defines a longitudinal axis 128 extending between hub end 124 and distal end 126. In alternative embodiments, wind turbine 100 includes any blade 112, 114, 116 that enables wind turbine 100 to operate as described herein.

Figure 2:
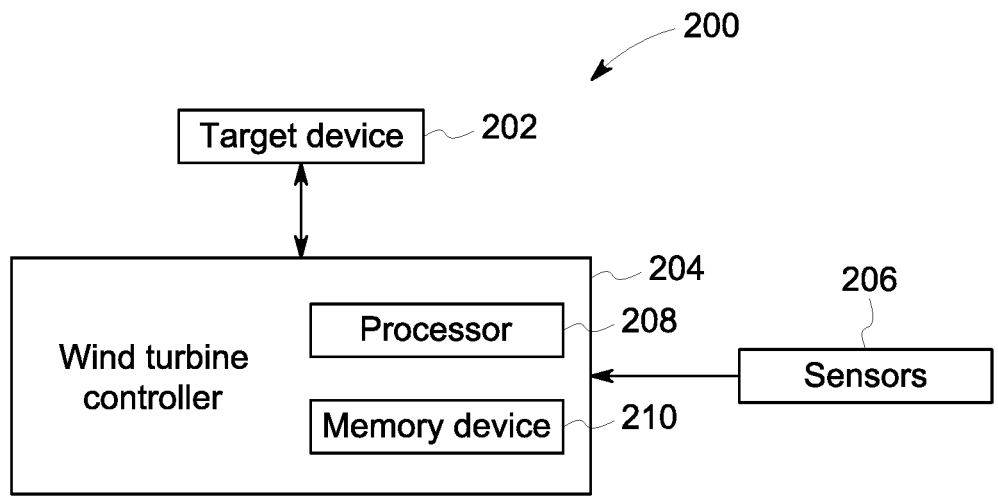
FIG. 2 is a block diagram of an exemplary wind turbine control system for use in controlling the wind turbine shown in FIG. 1.

FIG. 2 is a block diagram of an exemplary wind turbine control system 200. Wind turbine control system 200 includes a target device 202, a wind turbine controller 204, and one or more sensors 206. In some embodiments, target device 202 is substantially similar to wind turbine 100 (shown in FIG. 1). Additionally or alternatively, target device 202 may be another device capable of being controlled electronically. Wind turbine controller 204 is communicatively coupled to target device 202 and includes a processor 208 and a memory device 210. In some embodiments, at least some functionality of wind turbine controller 204 is performed by processor 208 and/or memory device 210.

In the exemplary embodiment, target device 202 includes a wind turbine that converts kinetic wind energy into blade aerodynamic forces that induce a mechanical rotational torque to generate electric power, for example, by transferring the kinetic wind energy into blade aerodynamic forces that induce a mechanical rotational torque. An amount of output power produced by target device 202 depends on, for example, an amount of speed and/or torque of operation of target device 202. In addition, other characteristics of target device 202 may depend on the speed and/or torque of operation of target device 202, such as a fatigue on components of target device 202.

Wind turbine controller 204 controls the operation of target device 202, for example, by controlling the speed and/or torque at which target device 202 operates. For example, in some embodiments, wind turbine controller 204 may control a pitch angle of blades 112, 114, 116 (shown in FIG. 1), a yaw of target device 202, a gearbox setting of target device 202, and/or another operating parameter of target device 202 that affects the speed and/or torque. By controlling the speed and/or torque of target device 202, wind turbine controller 204 may select the output power at which target device 202 operates.

Prior to normal operation of target device 202, wind turbine controller 204 operates target device 202 in an initial training phase. During the initial training phase, wind turbine controller 204 controls target device 202 according to at least one test parameter. For example, in some embodiments, the test parameter is a series of speed levels, torque levels, blade pitch set points, and/or corresponding output power levels. During the training phase, wind turbine controller 204 receives measurement data from sensors 206. In some embodiments, the measurement data includes general operating conditions of target device 202, such as an air density and/or wind speed, and data specific to each test data point, such as a fatigue on components of target device 202. Using the measurement data, wind turbine controller may generate a control model for target device 202. For example, in some embodiments, wind turbine controller 204 applies one or more machine learning algorithms to the received measurement data to generate the control model. In some embodiments, the control model is designed to achieve, for example, a maximum operating lifetime and/or a maximum annual energy production (AEP) of target device 202.

In some embodiments, a design of experiment phase is conducted, for example, during the initial training phase, where control parameters are cycled following a schedule, randomly, or intelligently through a pre-defined set of levels or via a random sampling or an intelligent approach (such as Bayesian optimization, reinforcement learning, etc.) over a continuous or discrete set of control set points. This design of experiment phase is concluded either based on time duration, on number of data instances collected, or another stopping criterion to obtain an initial set of training data. A machine learning model may be trained from data compiled during this data gathering phase either (a) to predict a figure of merit, such as, turbine power, and then identify set points that optimize that figure of merit; or (b) to directly recommend a set point that is likely to optimize that figure of merit. Once trained, this machine learning model may be used periodically and/or intermittently to determine optimal control settings, for example, for target device 202. The machine learning model may give an inherent assessment of model competency based on the uncertainty level of its prediction, such as in the case of ensemble models, Bayesian models (including Gaussian processes), non-conformal prediction intervals, or other methods that can provide prediction uncertainty. Alternatively, an assessment of model competency can be learned from the training data using density estimation, level-set estimation, one-class classifier, manifold learning, anomaly detection, or other supervised or unsupervised learning approaches. Additionally, wind turbine controller 204 may use both internal and external assessment of model competency for an obtained data instance during operation. In this way, for a particular query or feedback state, the machine learning model can assess its level of competence and if competent, then the controller will act on the model suggestions of control set points to maximize at least one figure of merit, such as power or life, and if incompetent, then use a baseline set point, continue at a previous set point, or use another control approach for safety or robustness to assign control set points.

During an operating phase, wind turbine controller 204 controls target device 202 based on the generated control model. For example, in some embodiments, wind turbine controller 204 receives measurement data from sensors 206, such as a current wind speed and/or a current air density. Using the current wind speed and/or current air density as an input, the control model may provide an output parameter, such as an output power, at which to operate target device 202. Wind turbine controller 204 then operates target device 202 accordingly. In some embodiments, wind turbine controller 204 continues to refine and/or update the control model during normal operation of target device 202 based on measurement data received from sensors 206 during the operating phase.

In some embodiments, wind turbine controller 204 is further configured to calculate a competence level for a given input of measurement data. For example, if the input data is the same or similar to data that was used to generate the control model, the competence level may be relatively high, and if the input data is different or dissimilar to previous data, the competence level may be relatively low. In some such embodiments, if the competence level is below a threshold, wind turbine controller 204 does not control target device 202 based on the current control model, and instead takes action to update the control model and increase the competence level. For example, in some embodiments, wind turbine controller 204 receives measurement data derived from other wind turbine control systems that experienced operating conditions similar to the current operating conditions of target device 202, and uses the received measurement data to update the control model. In some embodiments, wind turbine controller 204 additionally or alternatively initiates a subsequent training phase where measurement data reflective of the current conditions is collected from target device 202 and sensors 206 and used to update the control model. In some embodiments, the subsequent training phase is substantially similar to the initial training phase.

Figure 3:
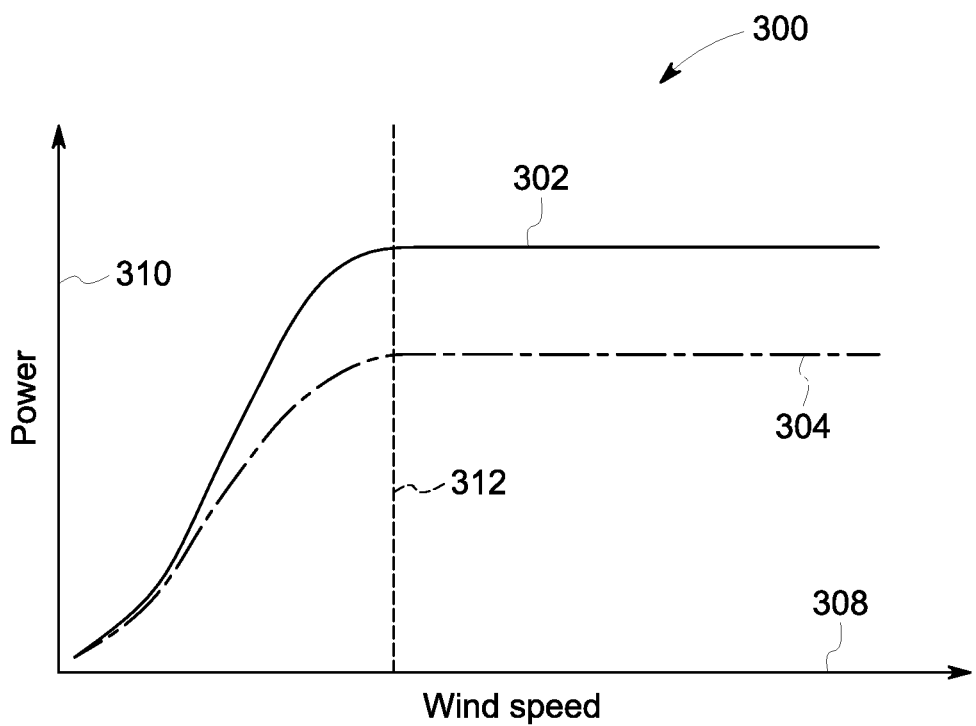
FIG. 3 is a graph illustrating exemplary power curves that may be used for controlling the wind turbine shown in FIG. 1.

FIG. 3 is a graph 300 illustrating a first power curve 302 and a second power curve 304 that may be used for controlling wind turbine 100 (shown in FIG. 1). Graph 300 includes a horizontal axis 308 corresponding to a wind speed such as, for example, a wind speed detected at wind turbine 100. Graph 300 further includes a vertical axis 310 corresponding to an output power of wind turbine 100. The output power of wind turbine 100 may be selected based on a current wind speed using, for example, first power curve 302 or second power curve 304.

The output power, when selected based on first power curve 302 or second power curve 304, generally increases as wind speed increases until a threshold wind speed 312 is reached, after which the output power remains constant. Controlling wind turbine 100 based on first power curve 302 generally results in a higher output power, and a correspondingly higher AEP, than controlling wind turbine 100 based on second power curve 304. Conversely, in some embodiments, controlling wind turbine 100 based on second power curve 304 results in a lower fatigue, and a correspondingly longer operating lifetime of wind turbine 100, than controlling wind turbine 100 based on first power curve 302. In some embodiments, to control wind turbine 100, one of first power curve 302 or second power curve 304 may be selected by wind turbine controller 204 using the generated control model based on current input conditions.

Figure 4:
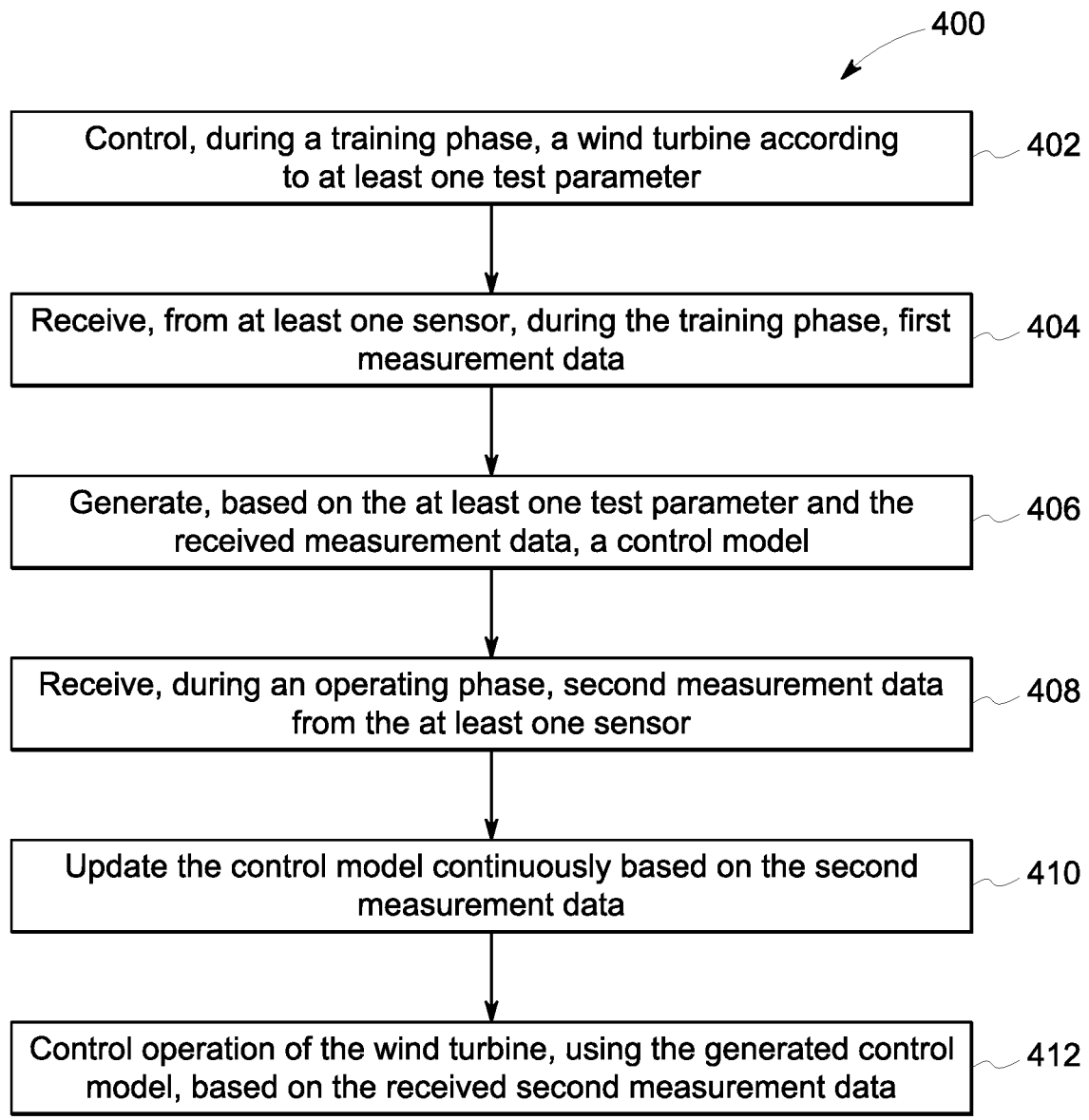
FIG. 4 is a flowchart of an exemplary method for controlling a wind turbine.

FIG. 4 illustrates an exemplary method 400 for controlling wind turbine 100. In some embodiments, method 400 is performed by wind turbine controller 204. Method 400 includes controlling 402, during a training phase, wind turbine 100 according to at least one test parameter. Method 400 further includes receiving 404, from at least one sensor (such as sensors 206), during the training phase, first measurement data. Method 400 further includes generating 406, based on the at least one test parameter and the received first measurement data, a control model. Method 400 further includes receiving 408, during an operating phase, second measurement data from the at least one sensor. Method 400 further includes updating 410 the control model continuously based on the second measurement data. Method 400 further includes controlling 412 the operation of wind turbine 100, using the generated control model, based on the received second measurement data.

An exemplary technical effect of the methods, systems, and apparatus described herein includes at least one of: (a) improving an annual energy production (AEP) of a wind turbine by using a machine-learning based control model to control the wind turbine; (b) improving a lifetime of a wind turbine by a machine-learning based control model to control the wind turbine; (c) providing a control model for a wind turbine by applying at least one machine learning algorithm to data collected from at least the wind turbine; and (d) improving a wind turbine control model by periodically and/or intermittently updating the wind turbine control model based on real time data; and (e) improving the annual energy production (AEP) of a group of wind turbines and/or wind farm by controlling the group of wind turbines and or wind farm using a machine learning based control model.

Exemplary embodiments of a system for continuous machine learning based control of wind turbines are described herein. The systems and methods of operating and manufacturing such systems and devices are not limited to the specific embodiments described herein, but rather, components of systems and/or steps of the methods may be utilized independently and separately from other components and/or steps described herein. For example, the methods may also be used in combination with other electronic systems, and are not limited to practice with only the electronic systems, and methods as described herein. Rather, the exemplary embodiment can be implemented and utilized in connection with many other electronic systems.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system comprising:
   a wind turbine;
   at least one sensor configured to detect at least one property of said wind turbine to generate measurement data; and
   a controller communicatively coupled to said wind turbine and said at least one sensor, said controller comprising at least one processor in communication with at least one memory device, said at least one processor configured to:
   control, during a training phase, said wind turbine according to at least one test parameter;
   receive, from said at least one sensor, during the training phase, first measurement data;
   generate, based on the at least one test parameter and the received first measurement data, a control model;
   control, during an operating phase, operation of said wind turbine using the generated control model;
   receive, during the operating phase, second measurement data from said at least one sensor;
   using the second measurement data, determine a competence level of the control model;
   update the control model based on the competence level and the second measurement data; and
   control operation of said wind turbine, using the updated control model.

2. The control system of claim 1, wherein said at least one processor is further configured to discontinue using the control model to control operation of the wind turbine when the competence level is below a threshold level.

3. The control system of claim 1, wherein said at least one processor is further configured to:
   determine that the competence level is below a threshold level; and
   initiate a subsequent training phase based on the determination.

4. The control system of claim 1, wherein to determine the competence level, said at least one processor is configured to compute the competence level using at least one of a supervised, semi-supervised, or an unsupervised learning method.

5. The control system of claim 1, wherein said controller is communicatively, coupled to at least one additional control system, and wherein said at least one processor is further configured to:
   receive, from the at least one additional control system, third measurement data; and
   generate the control model further based upon the received third measurement data.

6. The control system of claim 1; wherein to update the control model, said at least one processor is further configured to initiate a subsequent training phase to generate a revised control model based on the second measurement data.

7. The control system of claim 1, wherein to generate the control model, said at least one processor is configured to apply at least one machine learning algorithm to the first measurement data.

8. The control system of claim 1, wherein the first measurement data includes at least one of a wind speed, an air density, an output power, a temperature, and a wind stability measurement.

9. The control system of claim 1, wherein to control said wind turbine, said at least one processor is configured to control at least one of a torque, a speed, a blade pitch angle, and an angle of attack of said wind turbine.

10. The control system of claim 1, wherein to generate the control model, said at least one processor is configured to calculate at least one of a power and a fatigue of said wind turbine.

11. A controller communicatively coupled to a wind turbine and at least one sensor, said controller comprising at least one processor in communication with at least one memory device, said at least one processor configured to:
    control, during a training phase, the wind turbine according to at least one test parameter;
    receive, from the at least one sensor, during the training phase, first measurement data;
    generate, based on the at least one test parameter and the received first measurement data, a control model;
    control, during an operating phase, operation of said wind turbine using the generated control model;
    receive, during the operating phase, second measurement data from the at least one sensor;
    using the second measurement data, determine a competence level of the control model;
    update the control model based on the competence level and the second measurement data; and
    control operation of said wind turbine, using the updated control model.

12. The controller of claim 11, wherein said at least one processor is further configured to discontinue using the control model to control operation of the wind turbine when the competence level is below a threshold level.

13. The controller of claim 11, wherein said at least one processor is further configured to:
    determine that the competence level is below a threshold level; and
    initiate a subsequent training phase based on the determination.

14. The controller of claim 11, wherein to determine the competence level, said at least one processor is configured to compute the competence level using at least one of a supervised, semi-supervised, or an unsupervised learning method.

15. The controller of claim 11, wherein to update the control model, said at least one processor is further configured to initiate a subsequent training phase to generate a revised control model based on the second measurement data.

16. The controller of claim 11, wherein to generate the control model, said at least one processor is configured to apply at least one machine learning algorithm to the first measurement data.

17. The controller of claim 11, wherein to generate the control model, said at least one processor is configured to calculate at least one of a power and a fatigue of said wind turbine.

18. A method of controlling a wind turbine using a controller communicatively coupled to the wind turbine and at least one sensor, the controller including at least one processor in communication with at least one memory device, said method comprising:

controlling, by the controller, during a training phase, the wind turbine according to at least one test parameter;

receiving, by the controller, from the at least one sensor, during the training phase, first measurement data;

generating, by the controller, based on the at least one test parameter and the received first measurement data, a control model;

controlling, during an operating phase, operation of said wind turbine using the generated control model;

receiving, by the controller, during the operating phase, second measurement data from the at least one sensor;

using the second measurement data, determining a competence level of the control model, updating the control model based on the competence level and the second measurement data; and controlling operation of said wind turbine, using the updated control model.

19. The method of claim 18, further comprising discontinuing using the control model to control operation of the wind turbine when the competence level is below a threshold level.

20. The method of claim 18, wherein updating the control model comprises initiating, by the controller, a subsequent training phase to generate a revised control model based on the second measurement data.

* * * * *